(12) United States Patent
Ising

(10) Patent No.: US 10,113,555 B2
(45) Date of Patent: Oct. 30, 2018

(54) COMPRESSOR

(71) Applicant: VOLVO LASTVAGNAR AB, Göteborg (SE)

(72) Inventor: Magnus Ising, Lund (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/320,163

(22) Filed: Jun. 30, 2014

(65) Prior Publication Data
US 2014/0314590 A1 Oct. 23, 2014

Related U.S. Application Data

(63) Continuation of application No. 12/934,667, filed as application No. PCT/SE2008/000251 on Apr. 8, 2008.

(51) Int. Cl.
| | |
|---|---|
| *F04D 29/30* | (2006.01) |
| *F01N 13/10* | (2010.01) |
| *F02B 29/04* | (2006.01) |
| *F02B 37/013* | (2006.01) |

(Continued)

(52) U.S. Cl.
CPC .............. *F04D 29/30* (2013.01); *F02B 37/00* (2013.01); *F02B 37/004* (2013.01); *F02B 37/013* (2013.01); *F02B 37/025* (2013.01); *F01N 13/107* (2013.01); *F02B 29/0412* (2013.01); *Y02T 10/144* (2013.01)

(58) Field of Classification Search
CPC ...... F02B 37/013; F02B 37/00; F02B 37/004; F02B 37/025; F02B 29/0412; F04D 29/30; F01N 13/107; Y02T 10/144; F01D 5/048

USPC .......................................................... 60/612
See application file for complete search history.

(56) References Cited

U.S. PATENT DOCUMENTS

| | | | |
|---|---|---|---|
| 6,273,671 B1 * | 8/2001 | Ress, Jr. ................. | F01D 5/043 415/1 |
| 6,754,954 B1 * | 6/2004 | Decker .................... | B21K 1/36 29/557 |
| 2005/0196272 A1 * | 9/2005 | Nikpour ........................ | 415/206 |

(Continued)

FOREIGN PATENT DOCUMENTS

EP 0205001 A1 * 12/1986 ........... F04D 29/284

*Primary Examiner* — Mark Laurenzi
*Assistant Examiner* — Paul Thiede
(74) *Attorney, Agent, or Firm* — WRB-IP LLP

(57) ABSTRACT

A turbocharger unit for an internal combustion engine having at least one exhaust line for the evacuation of exhaust gases from the combustion chamber of the engine and at least one inlet line for the supply of air to the combustion chamber is provided. The turbocharger unit includes a turbine which interacts with a compressor in order to extract energy from the exhaust-gas flow of the engine and pressurize the inlet air of the engine. The compressor is of the radial type and is provided with an impeller having backswept blades in which the blade angle between an imaginary extension of the center line of the blade between root section and tip section in the direction of the outlet tangent and a line connecting the center axis of the impeller to the outer tip of the blade is at least about 40 degrees. The ratio between the inlet diameter of the impeller and its outlet diameter lies within the range 0.50-0.62. The compressor diffuser is provided with blades, the length of which has a ratio to the distance between them, along the periphery in the blade inlet, within the range 0.7-1.5.

6 Claims, 7 Drawing Sheets

(51) Int. Cl.
*F02B 37/02* (2006.01)
*F02B 37/00* (2006.01)

(56) References Cited

U.S. PATENT DOCUMENTS

| | | | |
|---|---|---|---|
| 2006/0123785 A1* | 6/2006 | Sundin et al. | 60/612 |
| 2006/0123787 A1* | 6/2006 | Gobert | F01D 5/048 |
| | | | 60/612 |
| 2008/0229742 A1* | 9/2008 | Renaud | F04D 29/284 |
| | | | 60/597 |

* cited by examiner

COMPRESSOR

The present application is a continuation of U.S. application Ser. No. 12/934,667, filed Sep. 27, 2010, which is the U.S. national stage of PCT/SE2008/000251, filed Apr. 8, 2008, both of which are incorporated by reference.

The present invention relates to a compressor in a turbocharger unit for an internal combustion engine.

The state of the art relating to turbocharger systems for the supercharging of diesel-type internal combustion engines, preferably for heavy-duty vehicles, usually comprises a single-stage compressor which is driven by a single-stage turbine, both of the radial type.

Superchargers suitable for a diesel motor of 6 to 20 liter cylinder capacity normally have an efficiency, under stationary conditions, of between 50% and 60% (ηcompressor*ηmechanics*ηturbine). In present-day diesel engines, the benefit from good efficiency is lower than for future engines, which will require higher boost pressure. Examples of systems which raise the supercharging, requirement are exhaust-gas recirculation for lower nitrogen oxide emissions, or systems involving variable control of inlet valves.

Higher-efficiency turbocharger systems offer an increased chance of meeting future requirements for environmentally friendly and fuel-lean engines. Hitherto, environmental requirements for diesel engines have usually resulted in impaired engine efficiency, which has thus meant that poorer use is made of the energy content of the fuel.

The compressor in a turbocharger unit consists of or comprises a bladed disc, an impeller, mounted on a shaft for rotation in a compressor housing. The compressor housing is constituted by a stationary shroud at short distance from the blades, typically less than 0.5 mm, a radially diffusing duct section, a so-called diffuser, and a volute outlet. Upon rotation of the shaft, gas, for example air, is sucked into the impeller, whereupon the static pressure level and flow velocity increase. During passage through the diffuser, some of the velocity energy of the gas is converted into a further static pressure increase, whereafter the gas leaves the compressor via the outlet. The volute shape of the outlet, as a result of its divergent duct shape, also contributes to a certain increase in the static pressure level.

The efficiency (i.e. isentropic efficiency) pressure buildup and stable working range (flow interval for a given rotation speed) of a compressor are substantially determined by its dimensions and blade configuration. For present-day compressors, the ratio between the inlet diameter of the impeller and its outlet diameter lies usually within the range 0.63-0.70. Present-day impellers are usually provided with backswept blades, in which the blade angle $\beta b2$, between an imaginary extension of the center line of the blade between root section and tip section in the direction of the outlet tangent and a line connecting the center axis of the impeller to the outer tip of the blade, lies within the range 25-40°.

A drawback with increasing the blade angle $\beta b2$ of the compressor is that the peripheral velocity and thus the tensions in the impeller, above all in the hub of the disc and the outlet of the blade, increase for the same pressure ratio. One method of reducing the tension in the outlet of the blade is to incline the blade forward in the direction of rotation, so that the tip of the blade lies in front of its root, i.e. where the blade meets the disc, in the outlet. This angle of inclination $\zeta$ lies for present-day compressors typically within the range 0-30°. For certain demanding applications, an increase in the blade angle $\beta b2$ of the compressor may also mean that the impeller must consist of or comprise a material with higher strength properties. For example, it is possible to pass from the present-day cast aluminum wheels to significantly more expensive forged, worked aluminum wheels or titanium wheels.

The diffuser in present-day compressors consists of or comprises two parallel or almost parallel duct walls, in which one duct wall constitutes a part of the impeller, whilst the other duct wall constitutes a part of the bearing housing which extends out to the volute outlet. With a view to improving the efficiency, above all at high pressure ratios, the diffuser can be provided with aerodynamically configured blades, so-called guide vanes, which is normally the case for radial compressors in gas turbine applications. The ratio between the length of the compressor blades (in the direction of flow) and the pitch, i.e. mutual spacing along the periphery, lies within the gas turbine industry typically within the range 3 to 5. This type of diffuser with sparsely placed and/or short diffuser blades is sometimes referred to as a LSA (Low Solidity Airfoil) diffuser.

It is desirable to provide a compressor with improved efficiency, especially at high pressure ratios, i.e. above about 3:1, whilst at the same time the scope of the working range is not impaired.

In a purpose-built compressor according to an aspect of the invention in a turbocharger unit for an internal combustion engine having at least one exhaust line for the evacuation of exhaust gases from the combustion chamber of the engine and at least one inlet line for the supply of air to said combustion chamber comprising a turbine which interacts with the compressor in order to extract energy from the exhaust-gas flow of the engine and pressurize the inlet air of the engine, the compressor is of the radial type, having an impeller with diameter ratio Di/Du between inlet and outlet within the range 0.50-0.62 and provided with backswept blades in which the blade angle $\beta b2$, between an imaginary extension of the center line of the blade between root section and tip section in the direction of the outlet tangent and a line connecting the center axis of the impeller to the outer tip of the blade, is at least about 40°, and in which the diffuser is provided with blades which have a ratio between length (in the direction of flow) and pitch, i.e. mutual spacing along the periphery in the blade inlet, within the range 0.7-1.5.

One advantage of an aspect of the present invention is that diesel engines which demand high pressure ratios, i.e. above 3:1, can be designed to attain a higher isentropic efficiency without further restrictions as regards a stable working range. This in turn leads to diminished power dependency and thus reduced specific fuel consumption for the engine.

The described compressor can also be used in a two stage turbo system, which has the advantage that each turbocharger operates with less pressure increase and thus lower peripheral velocity, so that the use of modern materials is facilitated. The higher density of the compressed gas then gives rise to a reduction in the inlet dimension of the second stage relative to the first stage, so that this compressor, given optimal configuration, acquires a diameter ratio approaching the lower limit within the range Di/Du=0.50-0.62.

Advantageous illustrative embodiments of the invention emerge from the following description.

BRIEF DESCRIPTION OF THE FIGURES

The invention will be described in greater detail below, with reference to illustrative embodiments shown in the appended figures, wherein.

DETAILED DESCRIPTION

An aspect of the invention is described used in a two-stage supercharging system for, in the first place, diesel engines having a cylinder capacity between about 6 and about 20 liters, for use preferably on heavy-duty vehicles such as lorries, buses and construction machinery. The supercharging system has the characteristic that it gives a considerably more effective supercharge than current systems. The supercharge is realized in two stages with two series-connected compressors of the radial type, with intermediate cooling. The first compressor stage, termed the low-pressure compressor, is driven by a low-pressure turbine of the axial type. The second compressor stage, the high-pressure compressor, is driven by a high-pressure turbine of the radial type.

Figure 1:
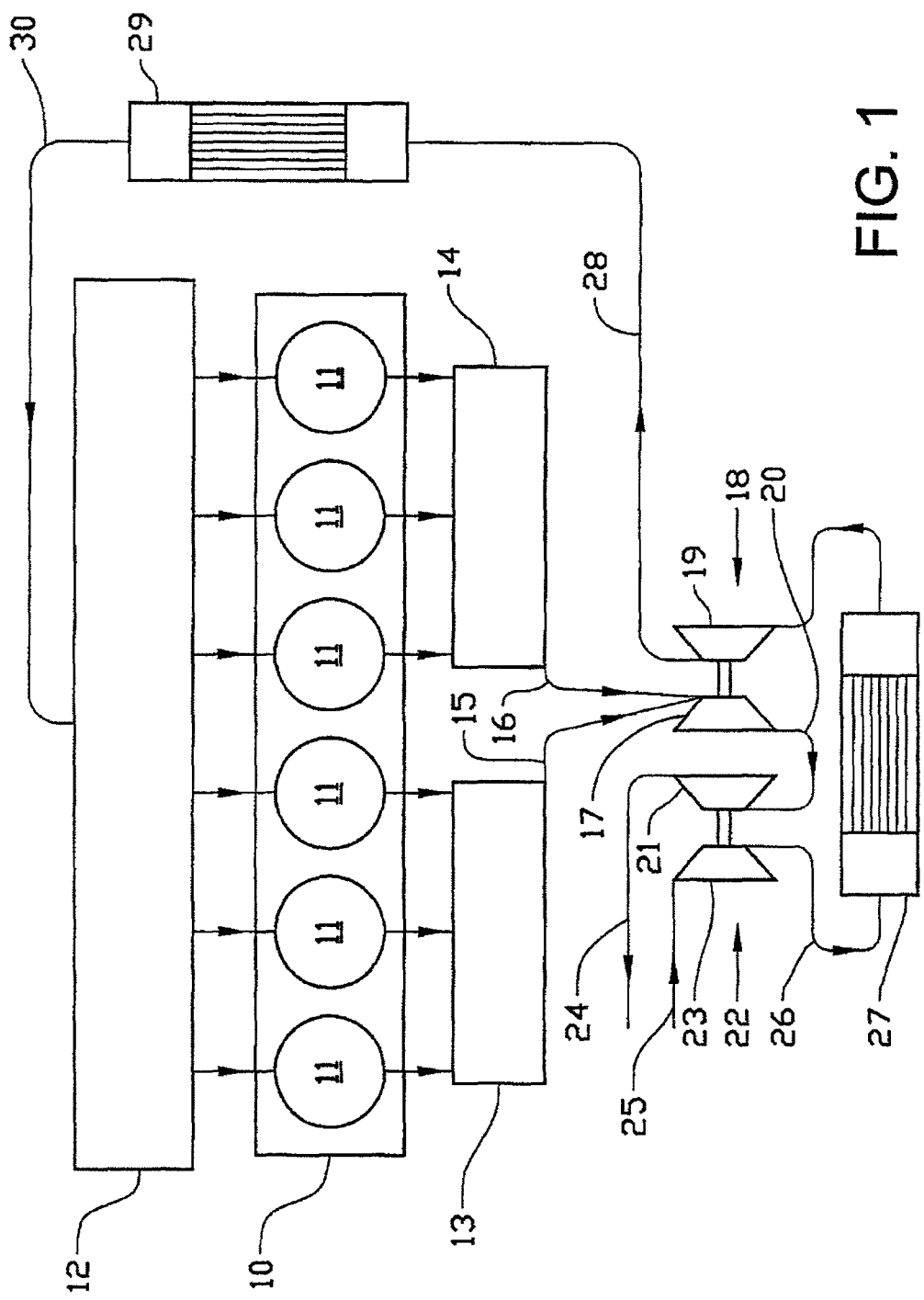
FIG. 1 shows schematically an internal combustion engine having a two-stage turbocharger system.

FIG. 1 shows an engine block 10 having six engine cylinders 11, which communicate in a conventional manner with an induction manifold 12 and two separate exhaust manifolds 13, 14. Each of these two exhaust manifolds receives exhaust gases from three of the engine cylinders. The exhaust gases are conducted via separate pipes 15, 16 up to a turbine 17 in a high-pressure turbo unit 18, which comprises a compressor 19 mounted on a common shaft with the turbine 17.

The exhaust gases are conducted onward via a pipe 20 to a turbine 21 in a low-pressure turbo unit 22, which comprises a compressor 23 mounted on a common shaft with the turbine 21. The exhaust gases are finally conducted onward via a pipe 24 to the exhaust system of the engine, which can comprise units for the after-treatment of exhaust gases.

Filtered inlet air can be taken into the engine via the pipe 25 and conducted to the compressor 23 of the low-pressure turbo unit 22. A pipe 26 conducts the inlet air onward via a first charge-air cooler 27 to the compressor 19 of the high-pressure turbo unit 18. After this two-stage boost with intermediate cooling, the inlet air is conducted onward via the pipe 28 to a second charge-air cooler 29, whereafter the inlet air reaches the induction manifold 12 via the pipe 30.

Figure 2:
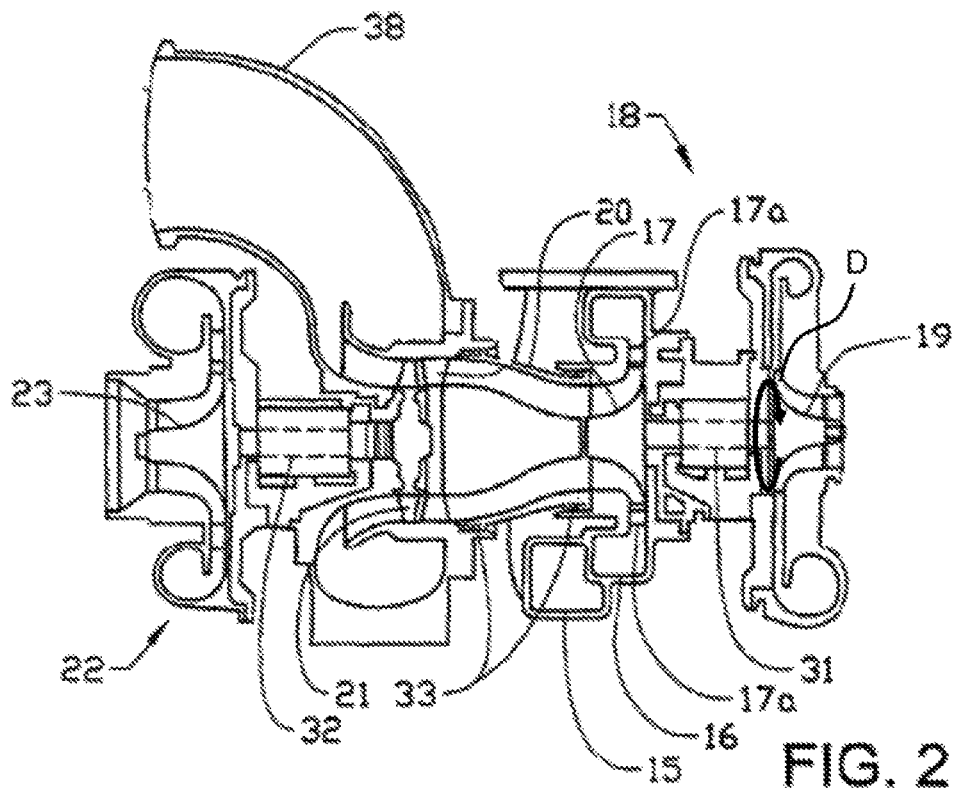
FIG. 2 is a longitudinal section through the two turbocharger stages incorporated in the turbocharger system.

The turbocharger system is shown in greater detail in FIG. 2, which illustrates the double, volute inlets 15, 16 to the high-pressure turbine 17, which each provide half the turbine with gas flow via inlet guide vanes 17a. The high-pressure turbine 17 is of the radial type and is connected to the low-pressure turbine 21 via the intermediate duct 20.

The high-pressure turbine 17 is mounted together with the high-pressure compressor 19 on the shaft 31. The low-pressure turbine 21 is correspondingly mounted together with the low-pressure compressor 23 on the shaft 32.

By combining an impeller with unusually low diameter ratio DIZDn, provided with backswept blades with unusually large blade angle $\beta b2$, with a diffuser provided with blades which are unusually short (in the direction of flow) and/or sparsely placed, a compressor with high efficiency, especially at high pressure ratios, i.e. above 3:1, can be produced, whilst at the same time the scope of the stable working range is not impaired.

Both the low-pressure turbo and the high-pressure turbo have compressors which are configured according to the described invention, i.e. impeller with low diameter ratio between inlet and outlet in combination with backswept blades with large angle, which will be described below with reference to FIGS. 3 and 4.

Figure 3:
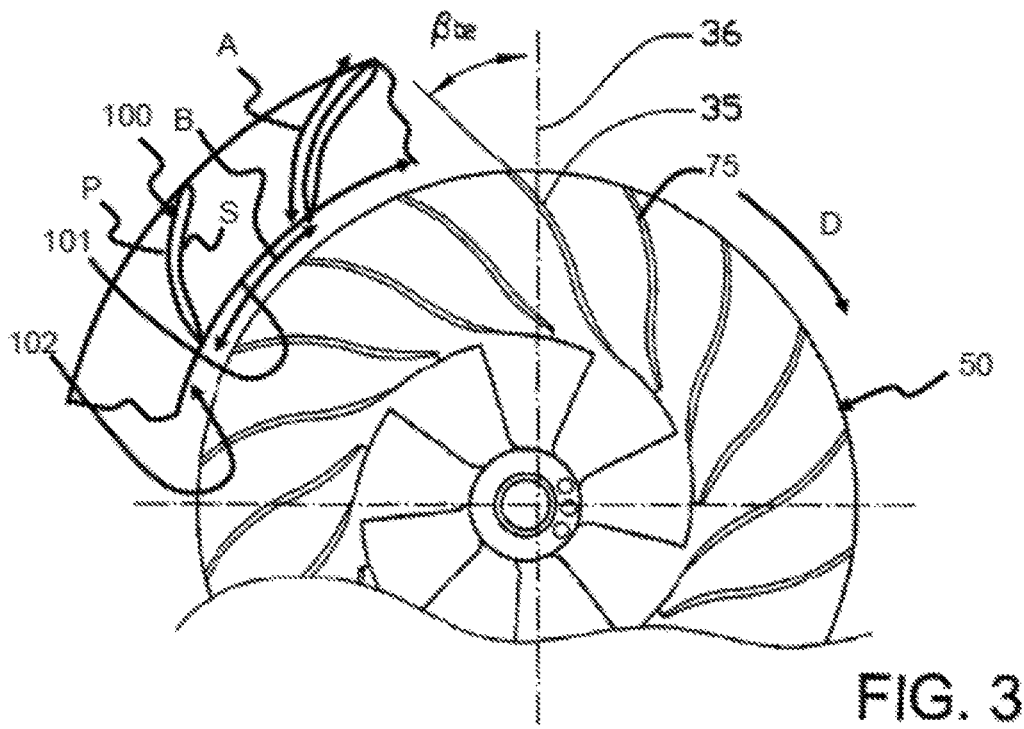
FIG. 3 shows in partially broken plan view toward the inlet an impeller used in the turbocharger unit according to an aspect of the invention.

From FIG. 3 it can be seen that a blade angle $\beta b2$, between an imaginary extension of the blade 35 along the center line between root section and tip section in the direction of the outlet tangent and a line 36 (in dash-dot representation) connecting the center axis of the impeller to the outer tip of the blade, is at least about 40°. Turbocompressors available on the market have blade angles $\beta b2$ between about 25° and about 40°. The effect of this increase in blade angle lies primarily in the fact that the impeller with associated turbine rotates at a higher rotation speed for a given pressure ratio. The increase in rotation speed means that the diameter of the turbine wheel and thus also its polar mass inertia can be reduced. As a side effect of this, the transient response of the engine is also improved, since the reduced mass inertia means that the turbine wheel can more easily accelerate to its effective rotation speed range. Moreover, the compressor efficiency increases, inter alia by virtue of a diminished velocity difference between the flow along the pressure side P and suction side S of the blade 100 as seen in FIG. 3, leading to a smaller secondary flow and thus lower losses, as well as by virtue of a reduction in flow velocity in the rotor outlet, leading to lower losses in the following diffuser.

Figure 4:
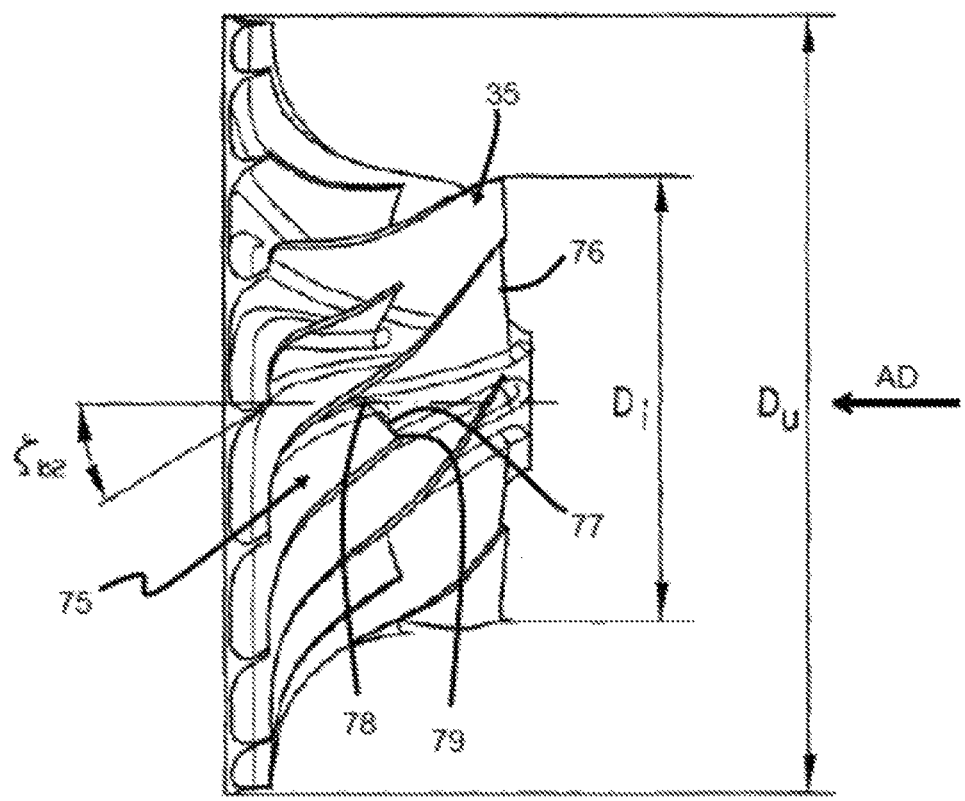
FIG. 4 shows a plan view from the side an impeller used in the turbocharger unit.

In this example, the blade outlets 50 (FIG. 3) of the impellers additionally have an inclination $\gamma b2$ in the direction of rotation D (FIG. 3), as can be seen from FIG. 4, with a view to reducing the tension increase in the blade outlet which arises due to the increased blade angle $\beta b2$.

As seen in FIG. 4, the impeller has splitter blades 75, each splitter blade of the splitter blades having an inlet edge 77 disposed axially downstream (downstream direction AD) of an inlet edge 72 of the full blades 35, the inlet edge of the splitter blade extending between a radially innermost end 78 and a radially outermost end 79, wherein the radially outermost end is located axially upstream of the radially innermost end. The inlet edge 77 of each splitter blade 75 defines a non-zero angle relative to a plane perpendicular to an axis of rotation of the impeller at all points along an entire length of the inlet edge of the splitter blade.

From FIG. 4 it can be seen that the diameter ratio $D\pm/Du$ of the impeller between inlet and outlet lies within the range 0.50-0.62. In another illustrative embodiment. $D\pm/Du$ can lie within the range 0.50-0.58. Turbocompressors available on the market have diameter ratios $Di/Du$ between about 0.63 and 0.70. This diminution of the diameter ratio results in an increase in the radius of curvature of the stream lines closest to the blade tip. The flow along these stream lines, which diffuses, i.e. has a decreasing velocity (relative to the blades), is favorably affected by the somewhat larger radius of curvature and thereby increased length and acquires, inter alia, a lesser tendency to separate from the wall, so that the efficiency, above all at high pressure ratios, is improved.

In order to increase the pressure build-up, both compressors are provided with guide vanes in the diffuser downstream of the respective impeller. This diffuser is of the LSA (Low Solidity Airfoil) type, which means that as seen in FIG. 3 it is provided with aerodynamically configured blades 100, the length A of which has a ratio to the distance B between the blades (pitch), along the periphery 101 in the blade inlet 102 which lies within the range 0.7-1.5. This diffuser type, unlike that which is used in gas turbine compressors, i.e. with long diffuser blades, has the characteristic of not reducing the stable working range of the compressor at high pressure ratios.

An outlet diffuser 37 is placed after the low-pressure turbine 21 in order to extract dynamic pressure from the turbine. The diffuser opens out into an exhaust collector 38, which guides gases out the exhaust pipe 24.

The high-pressure turbine 17 driving the high-pressure compressor 19 is of the radial type, having a turbine wheel which, for rotation at relatively high rotation speeds, is constructed with small diameter.

Figure 5:
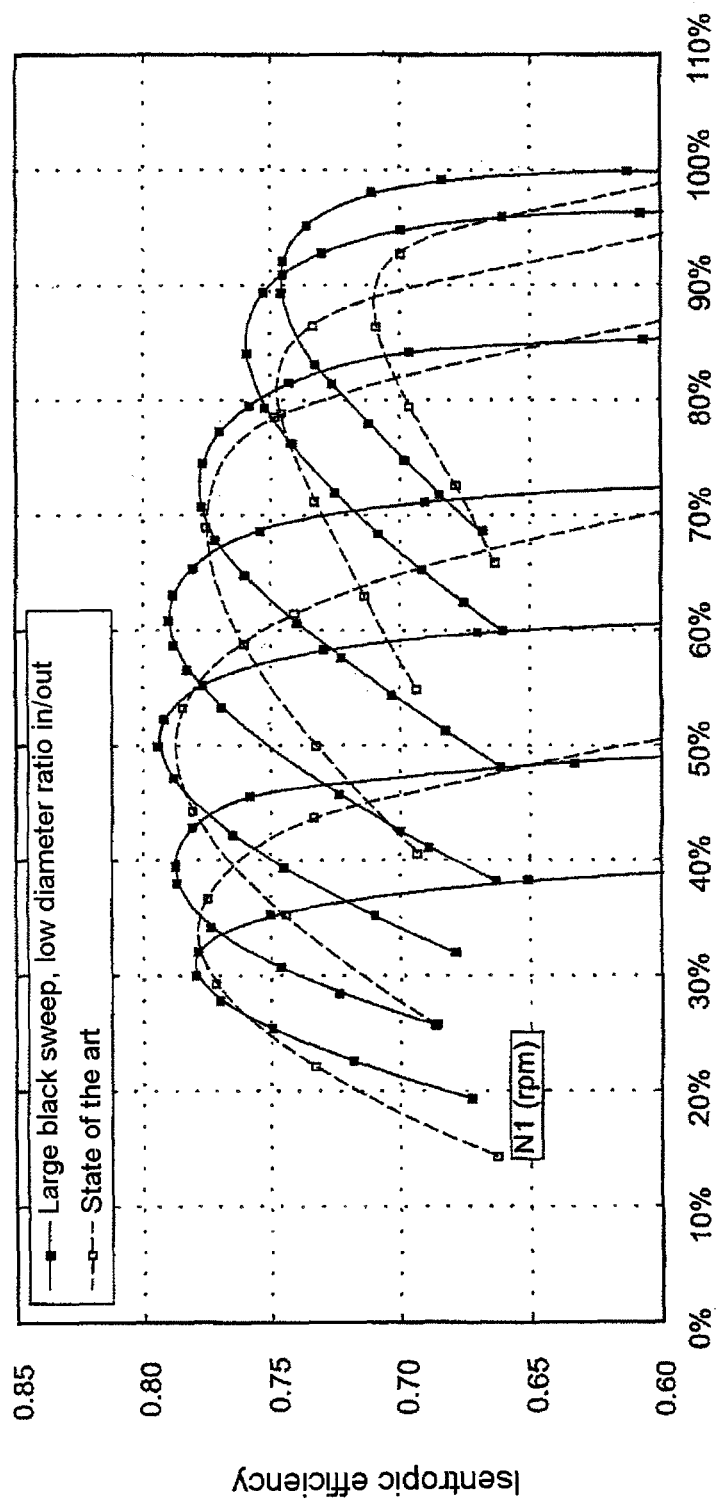
FIG. 5 shows isentropic efficiency as a function of the mass flow/(mass flow maximum) for a compressor according to an aspect of the invention and the state of the art.
Figure 6:
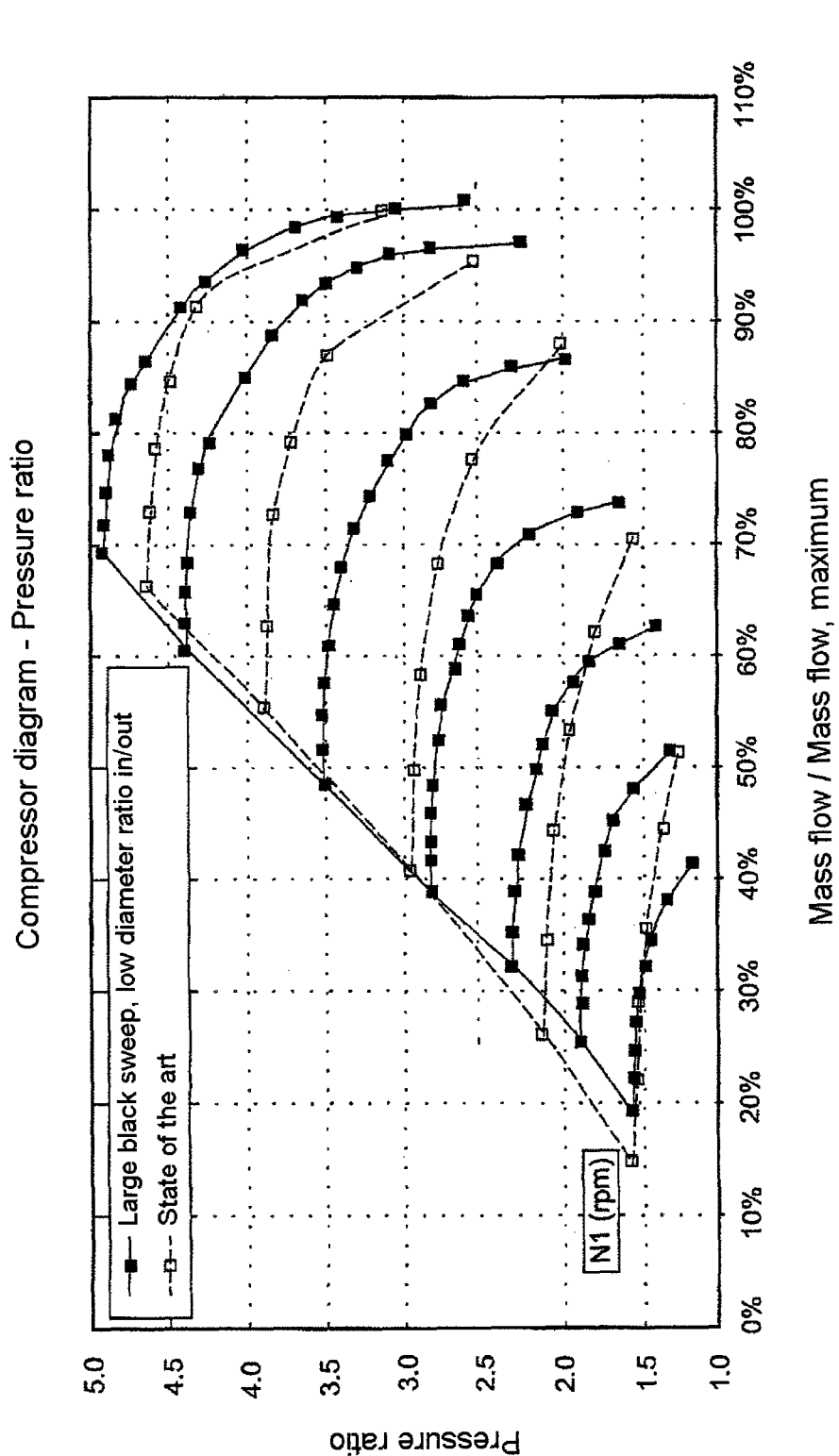
FIG. 6 shows pressure flow as a function of mass flow/(mass flow maximum) for a compressor according to an aspect of the invention and the state of the art.

As can be seen from FIGS. 5 and 6, which show characteristics for a compressor having a wheel diameter ratio D±/Dur blade outlet angle βb2 and bladed diffuser in accordance with an aspect of the invention, in comparison to a compressor according to the state of the art a significantly higher efficiency can be attained, above all at high pressure ratios, without any reduction in the stable operating range. Note that the rotation speed lines are not identical for the two compressors, but that the diagrams only constitute an illustration of the efficiency and stable operating range for the two types of compressors.

Figure 7:
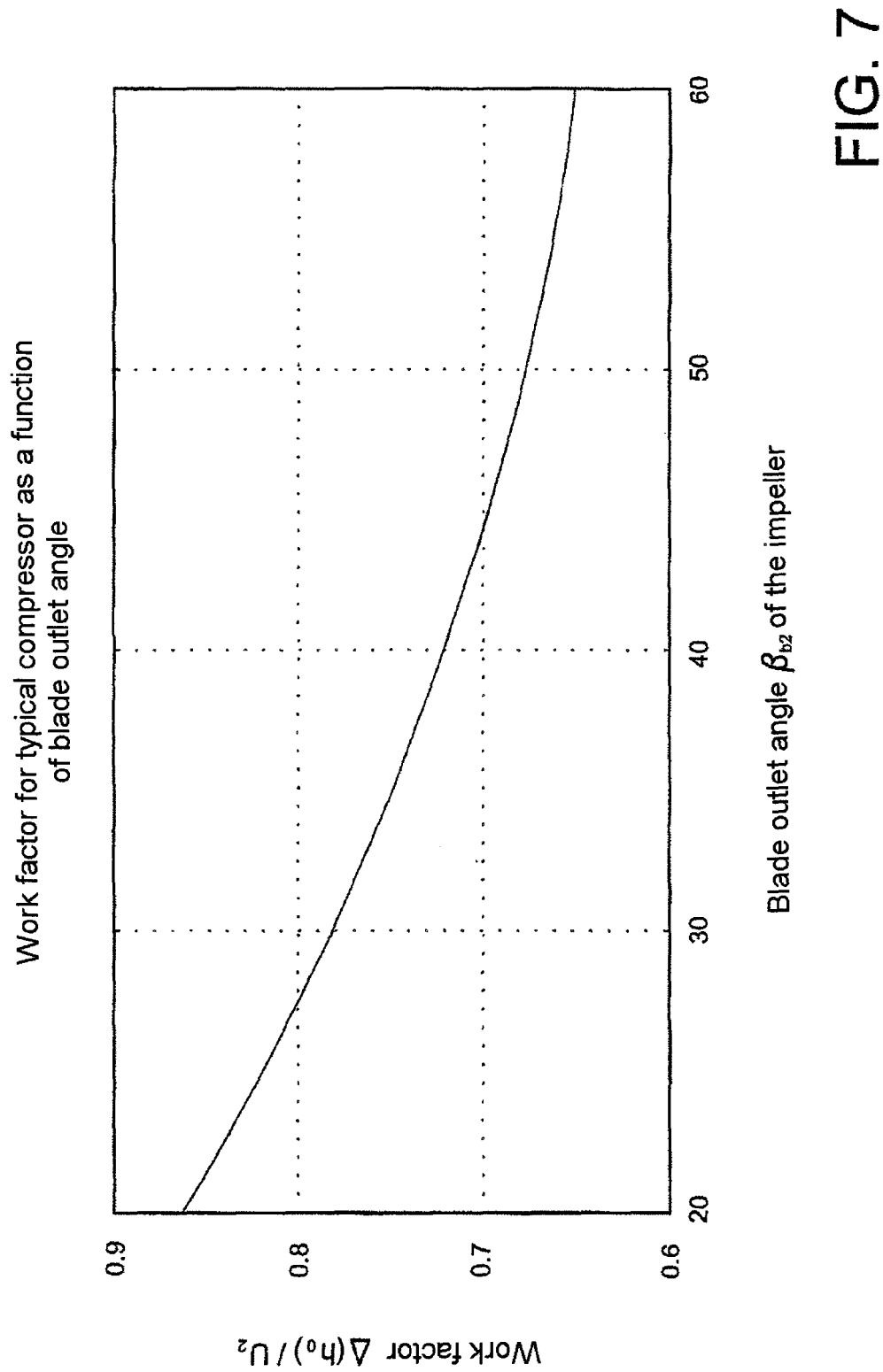
FIG. 7 shows a work factor for a typical compressor as a function of blade outlet angle.
Figure 8:
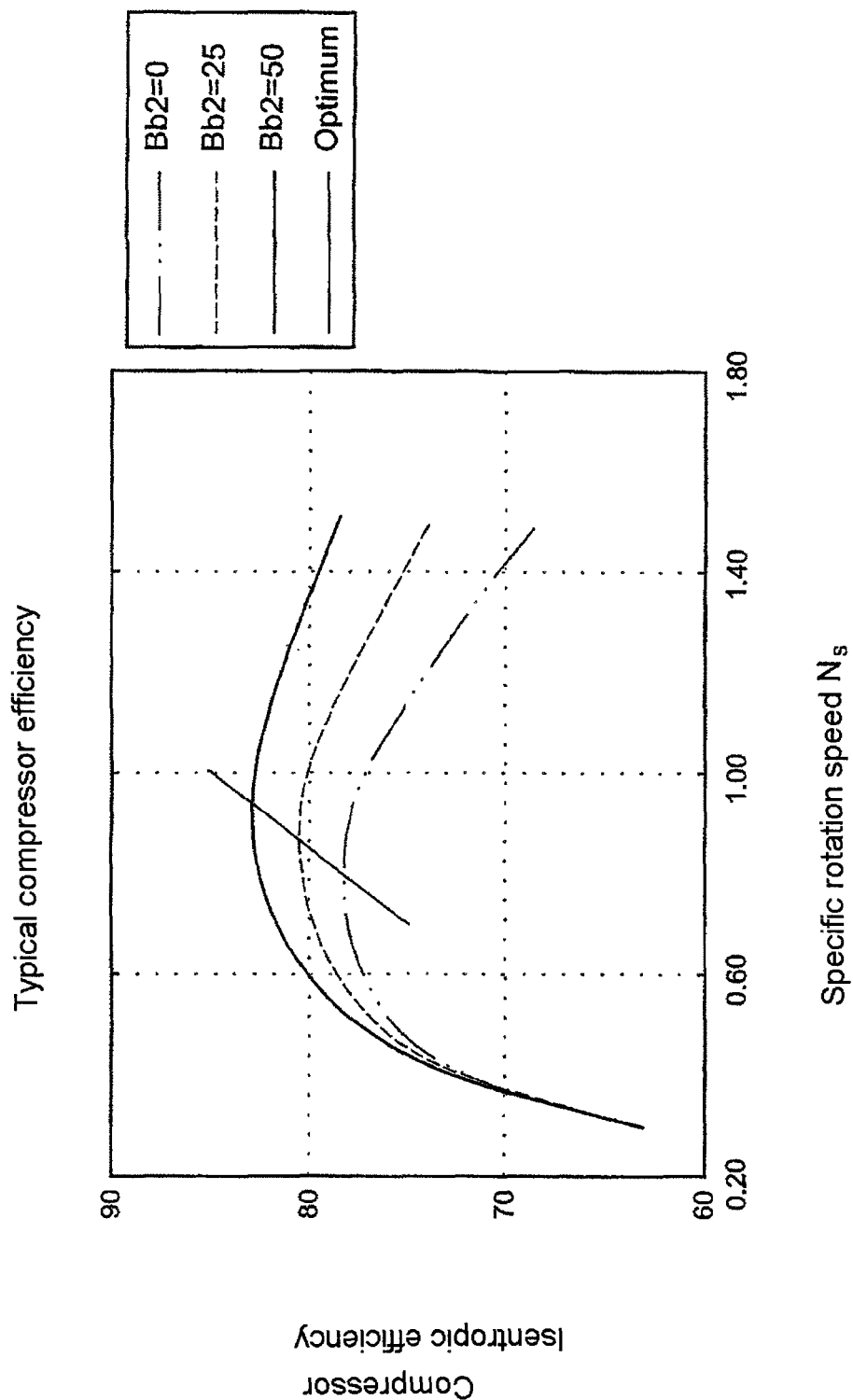
FIG. 8 shows a typical compressor efficiency as a function of a specific rotation speed.

An increased, blade angle βb2 nevertheless results in a diminution of the pressure increase for a given rotation speed. In order to compensate for this, a higher rotation speed or larger wheel diameter is required, which means that the tensions in the impeller, above all in the huh of the disk and the outlet of the blade, increase for the same pressure ratio. An unexpected effect is however that, for blade angles βb2 above about 40°, the optimal rotation speed for the compressor construction increases more than is required to maintain the pressure increase, which means that the diameter can therefore even be diminished. This can be seen from FIGS. 7 and 8, in which FIG. 7 shows the work factor $\delta h0/U^2$ as a function of the blade angle βb2, where δh0 is as a single figure pi increase and U is the peripheral velocity of the impeller. An increase in the blade angle βb2 from, for example, 40° to 50° means that the work factor diminishes by about 6%. In order to maintain the pressure ratio, the peripheral velocity U must then be increased by about 3% ($\sqrt{1.06}=1.03$), assuming unchanged efficiency. Optimal rotation speed can be read off from Diagram 4, which shows efficiency as a function of specific rotation speed Ns and blade angle βb2. Specific rotation speed Ns is here defined as $Ns=\omega*\sqrt{V/H_{ad}}^{3/4}$, where ω=angular velocity, V=inlet volume flow, Had=adiabatic single-figure pi increase (=$Cp*T_{0,in}*((\text{pressure ratio})^{((K-1)/K)}-1)$). From Diagram 4 it can be seen that optimal Ns and thus rotation speed, given unchanged volume flow, pressure ratio and inlet state, increases by about 4% when the blade angle βb2 is increased from 40° to 50°. The turbine which will drive the compressor can be reduced in diameter at least equivalently to the higher rotation speed of the compressor, which means low polar moment of inertia.

The invention should not be deemed to be limited to the above-described illustrative embodiments, but rather a host of further variants and modifications are conceivable within the scope of the following patent claims. For example, the turbocharger unit according to an aspect of the invention is described in connection with a six-cylinder diesel engine with two-stage turbocharge, but the invention is applicable to a full variety of piston engines from one cylinder and upward, and which are driven in two or four-stroke with one-stage as well as two-stage turbocharge. Aspects of the invention can also be applied to ship's engines and to engines having other cylinder capacities than the aforementioned. In the case of a two-stage turbocharge, the high-pressure turbine 17 can be without inlet guide vanes, or alternatively can be provided with fixed or geometrically rotatable inlet guide vanes 17a, and the low-pressure turbine 21 can be of the radial type as well as of the axial type.

The invention claimed is:

1. A turbocharger unit for an internal combustion engine, the internal combustion engine having at least one exhaust line for evacuation of exhaust gases from a combustion chamber of the internal combustion engine and at least one inlet line for supply of air to the combustion chamber, the turbocharger unit comprising:

a turbine and a compressor, the turbine interacting with the compressor in order to extract energy from an exhaust-gas flow of the internal combustion engine and to pressurize inlet air of the internal combustion engine, wherein the compressor is a radial compressor and the radial compressor includes:

an impeller having an axis of rotation, and, a diffuser disposed downstream from the impeller in a direction of fluid flow through the radial compressor, and the impeller includes:

a central hub disposed along the axis of rotation of the impeller and including backswept full blades and splitter blades both of which are symmetrically spaced about the hub, and each of the backswept full blades and each of the splitter blades being attached to the hub and respectively extending in an outward manner away from the hub, and only one splitter blade of the splitter blades is disposed between each pair of adjacent backswept full blades symmetrically spaced about the hub, and each of the backswept full blades has an inlet edge and each of the splitter blades has an inlet edge, the backswept full blades in which a blade angle, between an imaginary extension of a center line of at least one backswept full blade of the backswept full blades, between a root section and a tip section of the at least one backswept full blade, in a direction of an outlet tangent and a line connecting the rotation axis of the impeller to an outer tip of the at least one backswept full blade of the backswept full blades, is at least 40 degrees, and a ratio between an inlet diameter of the impeller and an outlet diameter of the impeller lies within a range of 0.50-0.62, the inlet edge of each backswept full blade of the backswept full blades extending outwardly from the hub so as to be generally disposed along a plane positioned transverse to the rotation axis of the impeller, and the splitter blades, the inlet edge of each splitter blade of the splitter blades being disposed axially downstream of the inlet edge of each of the backswept full blades, the inlet edge of each splitter blade extending between a radially innermost end disposed adjacent the hub and a radially outermost end spaced apart from the hub and the innermost end, wherein the radially outermost end is located axially upstream of the radially innermost end, a tangent to the inlet edge of each splitter blade defining a non-zero angle relative to a plane perpendicular to the axis of rotation of the impeller at all points along the entire length of the inlet edge of each splitter blade, and the diffuser being provided with diffuser blades, a ratio of a length of the diffuser blades to a distance between the diffuser blades, along a periphery in a blade inlet, being within a range of 0.7-1.5, for diminishing velocity difference between flow of fluid flowing along a pressure side and a suction side of each of the diffuser blades for increasing efficiency of the radial compressor during operation of the radial compressor of the turbocharger unit in the internal combustion engine.

2. The turbocharger unit as claimed in claim 1, wherein the blade angle is at least 45 degrees.

3. The turbocharger unit as claimed in claim 1, wherein the at least one backswept full blade inclines, at an angle of inclination greater than 0 degrees, in a direction of rotation in an outlet of the impeller.

4. The turbocharger unit as claimed in claim 3, wherein the angle of inclination is at least 30 degrees.

5. The turbocharger unit as claimed in claim 1, wherein the blade angle is between 40-50 degrees.

6. The turbocharger unit as claimed in claim 1, wherein the at least one backswept full blade inclines, at an angle of inclination between 0 and 30 degrees, in a direction of rotation in an outlet of the impeller.

* * * * *